United States Patent [19]

Dryer

[11] 3,836,159
[45] Sept. 17, 1974

[54] CAPTIVE PLASTIC SEAL
[75] Inventor: Eldon O. Dryer, Malibu, Calif.
[73] Assignee: W. S. Shamban & Co., West Los Angeles, Calif.
[22] Filed: Sept. 7, 1972
[21] Appl. No.: 287,045

[52] U.S. Cl.................. 277/180, 277/189, 285/336
[51] Int. Cl............................................. F16j 15/12
[58] Field of Search .......... 277/180, 189, 166, 178, 277/236 B, 207; 285/336

[56] References Cited
UNITED STATES PATENTS
3,355,181  11/1967  Olson.................................. 277/180
3,481,613  12/1969  Hathaway........................... 277/207

FOREIGN PATENTS OR APPLICATIONS
1,477,551  3/1967  France................................ 277/180

Primary Examiner—Harry N. Haroian
Assistant Examiner—Robert I. Smith
Attorney, Agent, or Firm—Smythe, Roston & Pavitt

[57] ABSTRACT

A seal comprising a sealing ring of deformable sealing material having inner and outer peripheral surfaces and inner and outer retainer rings. Each of the retainer rings is concave in axial cross section and is resiliently deformable in the radial direction.

12 Claims, 7 Drawing Figures

CAPTIVE PLASTIC SEAL

BACKGROUND OF THE INVENTION

A captive seal is one in which a sealing material is completely confined and compressively loaded beyond its yield point. The compressive loading causes the sealing material to flow into the minute crevices and surface irregularities of the confining walls to form a tight seal. One advantage of captive seals is that the surfaces which confine the seal need not have a good finish.

The sealing material can be any material which will deform under load. However, metals generally require too much stress to cause them to flow sufficiently and more ductile metals may tend to work harden. Elastomers can be used; however, their temperature range is limited, and they are subject to attack by various solvents and chemicals. Elastomers become extremely brittle at very low temperatures and cannot be used for cryogenic applications. Fluoro-plastics such as Teflon do not possess the disadvantages noted above, and for this reason are preferred. Captive plastic seal constructions are shown, for example, in U.S. Pat. Nos. 3,572,735 and 3,594,022.

One problem with captive plastic seals is to make certain that the sealing material is compressively loaded well above its yield point. If the requisite compressive load is lost, the sealing material will not be forced into the surface irregularities and leakage may result. Compressive loading may be reduced, for example, when the temperature is substantially reduced.

According to the present invention, the cavity for the sealing material is defined, in part, by an element which reduces the volume of the cavity in response to reduction in the compressive stress on the sealing material. This is accomplished without using intricate, wave-like spring strips within the sealing material. Rather, the present invention employs a spring element which is loaded when the sealing material is compressively loaded. The spring element is configured and positioned so that it loads the sealing material as it resiliently deforms. Thus, if the compressive stress in the sealing material is reduced, the resilient spring element expands to take up some of the relaxation in the sealing material.

The spring element can advantageously take the form of a ring which defines a cavity in axial cross section. Loading of the ring element is in a direction which tends to flatten the cross section of the spring element, i.e., to reduce the cavity depth. Thus, the spring element is not of intricate shape and is not bent back on itself when in use.

A seal is ordinarily used in a groove formed between two members and the interface between these two members communicates with the groove. As the sealing material is to be substantially compressively loaded, it is necessary to block off or isolate the groove from the interface to prevent the sealing material from extruding into the interface. This can advantageously be accomplished by retainer rings.

Another feature of the present invention is to combine the function of the spring element as discussed above with one or both of the retainer rings. When this is done, each of the retainer rings is concave in axial cross section so that it can carry out the spring functions noted above. In addition, each of the retainer rings is positioned in confronting relationship to the interface between the two members so that it can function as an extrusion prevention device.

The retainer rings can advantageously be formed of metal. The sealing material is preferably a fluoroplastic such as Teflon. The sealing ring may be an integral mass or may be in multiple masses divided along a circumferentially extending line or plane. The sealing ring can advantageously have inner and outer cavities for cooperating with the inner and outer retainer rings, respectively, to thereby mount the retainer rings on the sealing ring to form a sealing assembly.

Another feature of the present invention relates to the coaction between the seal groove and the retainer rings. The seal groove can advantageously include a pair of axially spaced end walls and a pair of radially spaced circumferentially extending walls. One of the members defines a first of the end walls and sections of the inner and outer circumferentially extending walls. Such sections of the circumferentially extending walls are inclined toward each other as they extend toward the first end wall. The two members are movable toward each other to apply an axial compressive load on the sealing ring. As the two members are moved toward each other, the inclined sections of the circumferentially extending walls cam the associated portions of the retainer rings radially toward each other and toward the sealing ring. The retainer rings may be caused to resiliently bulge away from each other in the radial direction at the interface between the two members.

The invention can be best understood by reference to the following description taken in connection with the accompanying illustrative drawings.

DESCRIPTION OF THE PREFERRED EMBODIMENTS

Figure 1:
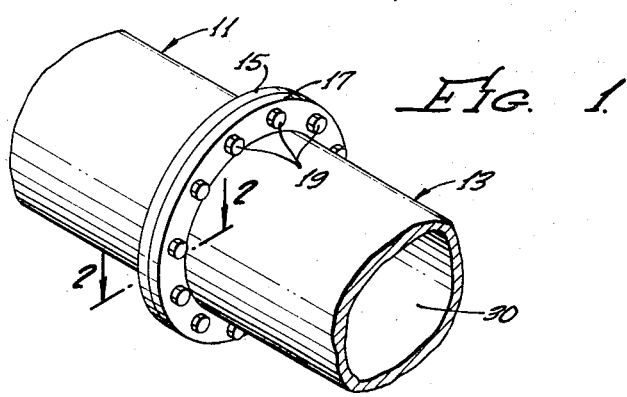
FIG. 1 is a fragmentary perspective view of a flanged pipe connection using a seal constructed in accordance with the teachings of this invention.
Figure 2:
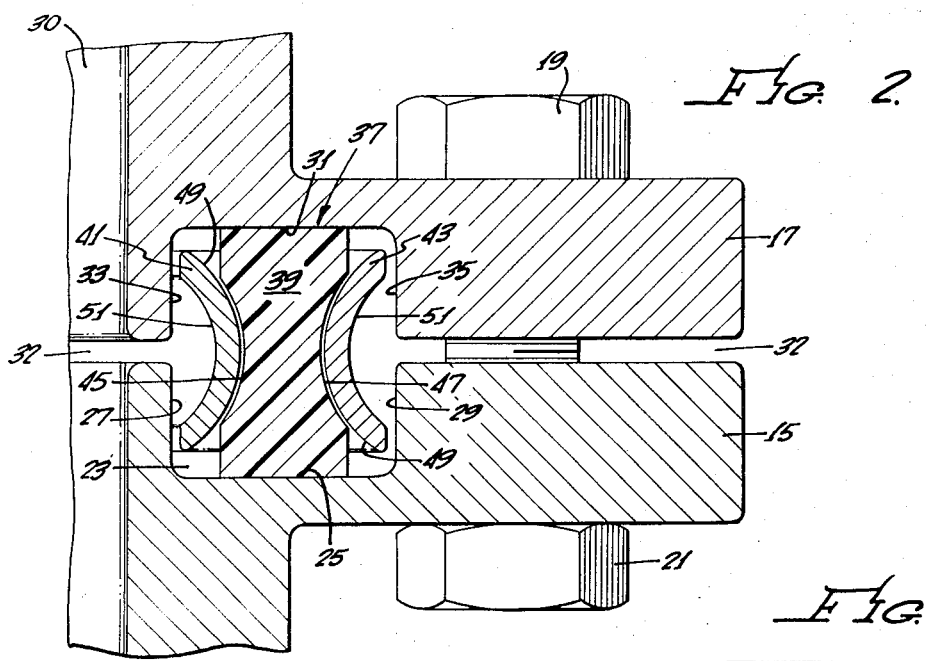
FIG. 2 is an enlarged fragmentary sectional view taken generally along line 2—2 of FIG. 1 with the bolts of the flanged fitting being relatively loose so that the sealing ring is not under compressive load.

FIG. 1 shows a pair of flanged pipes 11 and 13 having confronting flanges 15 and 17, respectively, which are interconnected by a plurality of bolts 19 and nuts 21 (FIG. 2). With reference to FIG. 2, the flanges 15 and 17 cooperate to define an annular seal groove 23. Specifically, the flange 15 defines an end wall 25 and radially spaced, circumferentially extending wall sections 27 and 29, and the flange 17 similarly defines an end wall 31 and radially spaced, circumferentially extending wall sections 33 and 35. The end walls 25 and 31 are axially spaced.

The flanged pipes 11 and 13 define a passage 30 extending therethrough. The flanges 15 and 17 are arranged in confronting relationship and the region between the pipes is an interface 32.

A seal 37 is positioned in the groove 23. The seal 37 includes a sealing ring 39 and a pair of retainer rings or elements 41 and 43 which also serve as spring elements for assisting to provide a resilient load on the sealing ring. The sealing ring 39 is preferably constructed of a fluoro-plastic such as Teflon. The sealing ring 39 extends continuously completely around the passage 30 with the cross section shown in FIG. 2 being typical. In the embodiment illustrated, the sealing ring 39 has flat end faces adapted to engage the end walls 25 and 31, respectively, and circumferentially extending inner and outer peripheral surfaces defining inner and outer cavities 45 and 47, respectively. The cavities 45 and 47 open inwardly and outwardly, respectively, and the sealing ring 39 is symmetrical in axial cross section about a central longitudinal axis which bisects its cross section. Each of the inner and outer cavities 45 and 47 is formed by an arcuate portion of the peripheral surfaces of the sealing ring, and in the embodiment illustrated, such arcuate surfaces form portions of a circle in axial cross section.

The retainer rings 41 and 43 are constructed of a suitable resilient metal such as a high strength, corrosion resistant steel and are adapted to confront and span the interface 32. Each of the retainer rings 41 and 43 extends continuously completely around the passage 30 with the cross section shown in FIG. 2 being typical. The retainer rings 41 and 43 are concave with the concavities opening inwardly and outwardly, respectively. Each of the retainer rings is in the form of a metal strip, the cross section of which is concave. Each of the retainer elements 41 and 43 has concave surfaces 49 and 51 with the concave surfaces 49 being seated in the concavities 45 and 47, respectively, and with the concave surfaces 51 opening radially in a direction away from the sealing ring 39.

In the position shown in FIG. 2, the bolts 19 and the nuts 21 are relatively loose and the sealing ring 39 is under no significant axial load. In this condition, the retainer rings 41 and 43 may be slightly spaced from or loosely engage the circumferentially extending wall sections 27, 33 and 29, 35.

Figure 3:
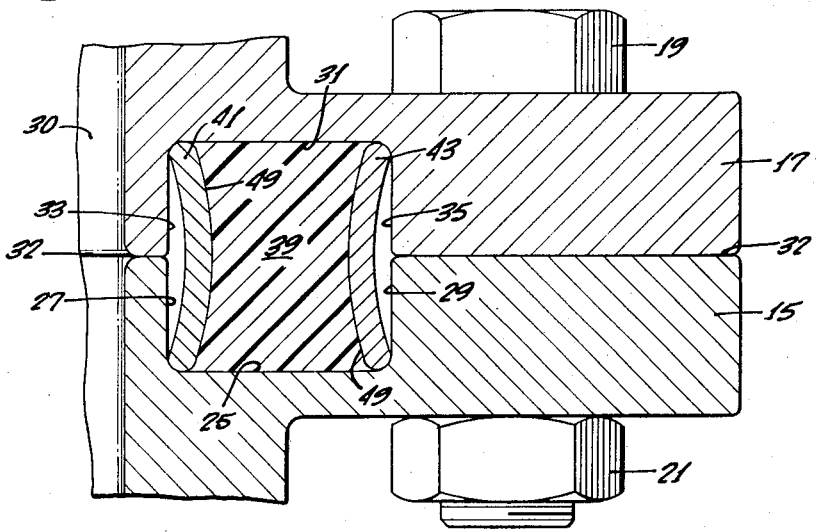
FIG. 3 is a fragmentary sectional view similar to FIG. 2 with the bolts tightened to compressively load the sealing ring.

When the nuts 21 are tightened as shown in FIG. 3, the flanges 15 and 17 and hence the end walls 25 and 31 are drawn closer together. This applies an axial compressive load to the sealing ring 39 which is sufficient to cause plastic flow of the sealing ring 39. Specifically, the sealing ring 39 is axially compressed and radially expanded. The radial expansion of the sealing ring 39 forces the retainer rings 41 and 43 radially inwardly and radially outwardly, respectively, and into tight engagement with their circumferentially extending wall sections 27, 33 and 29, 35. As radial expansion of the sealing ring 39 continues, the radial forces applied to the retainer elements 41 and 43 tends to flatten them and the retainer elements resiliently resist being flattened. Also, the radial expansion of the sealing ring 39 places hoop stresses in the retainer ring 43 and circumferential compressive stresses in the retainer ring 41, and this further causes the retainer rings to resiliently resist plastic flow of the sealing ring.

With the nuts 21 tightened as shown in FIG. 3 to bring the flanges 15 and 17 into engagement, the surfaces 49 of the retainer rings 41 and 43 and the end walls 25 and 31 define a completely enclosed cavity to captivate or contain the sealing ring 39. The compression of the sealing ring 39 is sufficient to cause the material to flow into all of the very minute surface irregularities of the end walls 25 and 31 and of the surface 49 to thereby form a very right seal. In addition, the cavity is resiliently radially expanded by the axially compressive force on the sealing ring 39 in that the retainer rings 41 and 43 are partially resiliently flattened. Thus, any relaxation or loss of compressive stress in the sealing element 39 is at least partially taken up by resilient "expansion" of the retainer rings 41 and 43. Such relaxation of the sealing ring 39 may occur, for example, when the pipes 11 and 13 are used to carry cryogenic liquids. Thus, the cavity for the sealing ring 39 is, in effect, shrinkable in response to reduction of compressive stress in the sealing ring 39 to thereby tend to maintain the requisite compressive stress in the sealing ring. In addition to the function described above, the retainer rings 41 and 43 prevent extrusion of the sealing ring 39 into the interface 32.

Figure 4:
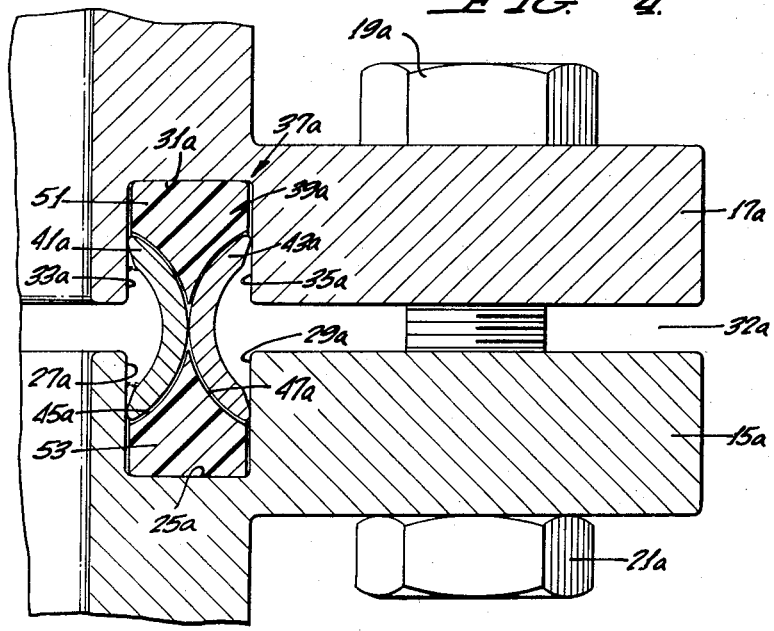
FIG. 4 is a sectional view similar to FIG. 2 of a second embodiment of seal constructed in accordance with the teachings of this invention with the sealing ring being substantially uncompressed.
Figure 5:
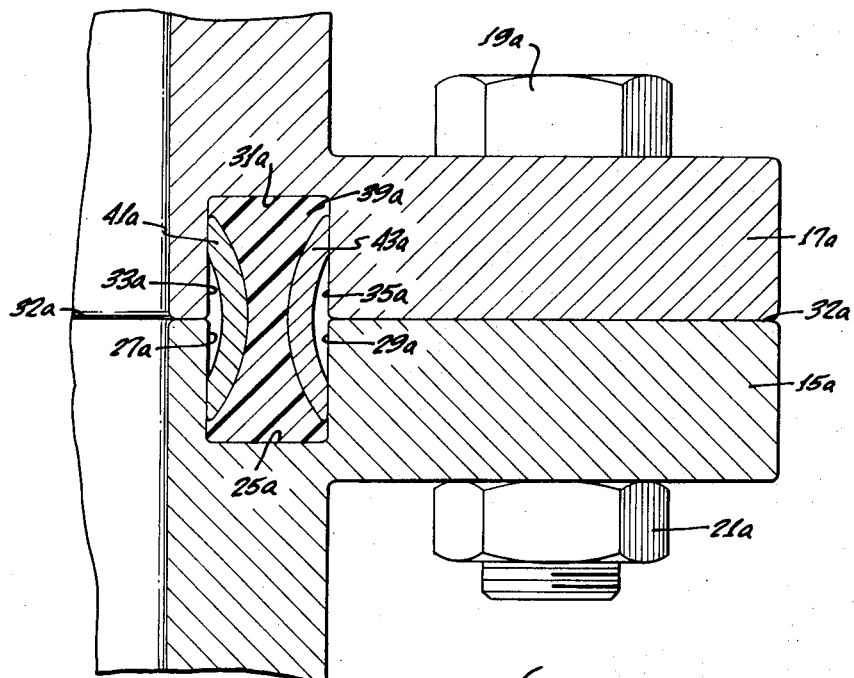
FIG. 5 is a sectional view similar to FIG. 3 of the second embodiment with the sealing ring substantially compressively loaded.

FIGS. 4 and 5 show a seal 39a which forms a second embodiment of the present invention. Portions of the embodiment of FIGS. 4 and 5 corresponding to portions of the embodiment of FIGS. 1-3 are designated by corresponding reference numerals followed by the letter a. The embodiment of FIGS. 4-5 is substantially identical to the embodiment of FIGS. 1-3 except that the sealing ring 39a includes a pair of sealing ring sections 53 and 55 and the seal cavity or groove of FIG. 4 is longer and narrower than the seal cavity of FIG. 2. The embodiment of FIGS. 4 and 5 adapts the concepts of FIGS. 1-3 to an elongated seal groove. In addition, the embodiment of FIGS. 4 and 5 is particularly adapted for smaller diameter flanges. With the seal 37a in the relaxed or uncompressed position shown in FIG. 4, the sealing ring sections 53 and 55 are axially separated, but they do cooperate to define an inner cavity 45a and an outer cavity 47a. The retainer rings 41a and 43a are seated in the cavities 45a and 47a, respectively.

When the nuts 21a are tightened, the end walls 25a and 31a are drawn closer together to thereby axially advance the sealing ring sections 53 and 55 toward each other. The sloping arcuate surfaces which define the cavities 45a and 47a are, therefore, brought closer together and cam the retainer elements 41a and 43a tightly against the circumferentially extending wall sections 27a, 33a and 29a, 35a. Upon further movement of the end walls 25a and 31a toward each other, the sealing ring sections 53 and 55 are brought into engagement and plastic flow thereof is initiated. This results in radial expansion of the sealing ring sections 53 and 55 which tends to flatten the retainer rings 41a and 43a and to make the sealing ring 39a appear as an integral mass as shown in FIG. 5. The retainer rings 41a and 43a function in the same manner as described hereinabove with reference to the retainer rings 41 and 43 (FIGS. 1-3).

Figure 6:
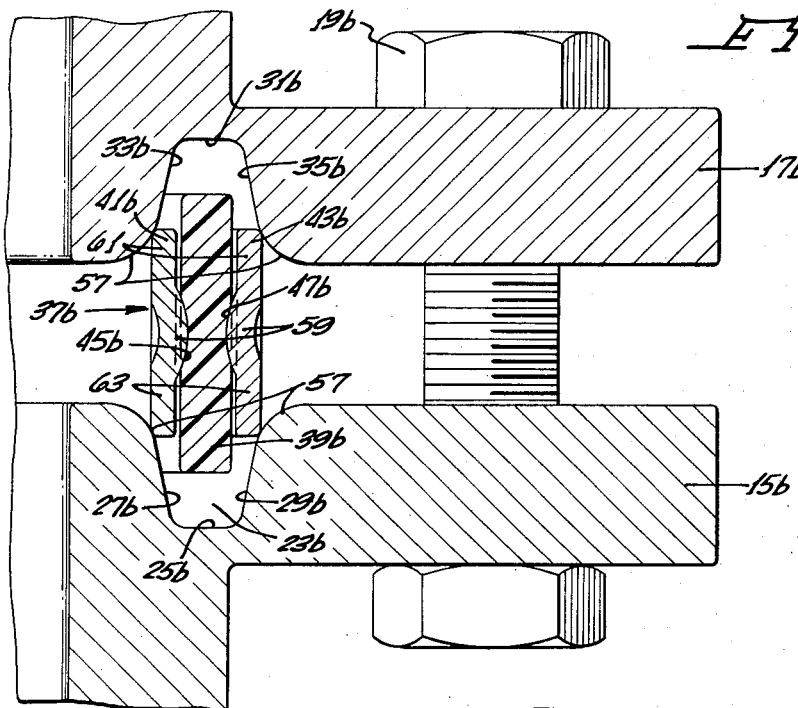
FIG. 6 is a sectional view similar to FIG. 2 of a third embodiment of seal constructed in accordance with the teachings of this invention with the sealing ring substantially uncompressed.
Figure 7:
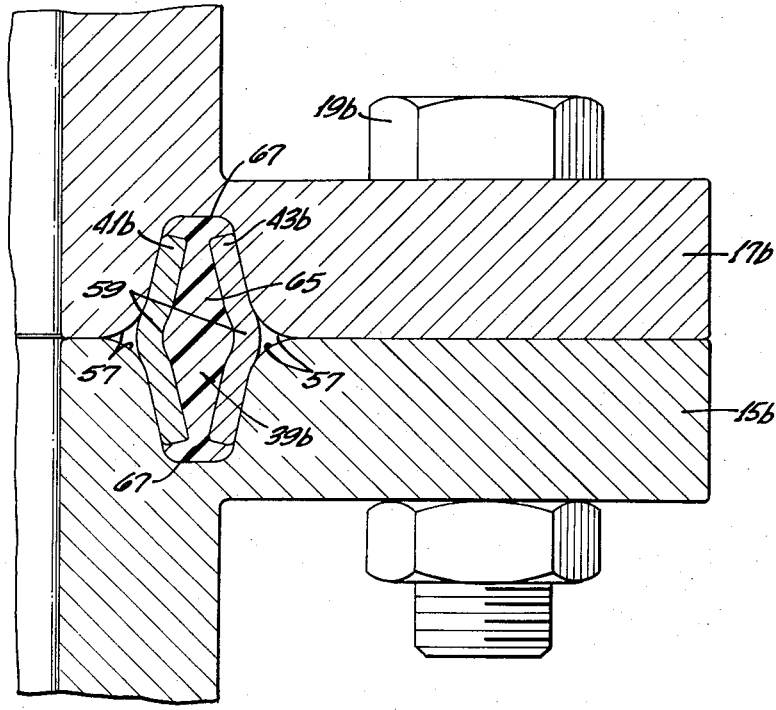
FIG. 7 is a sectional view similar to FIG. 3 showing the third embodiment of the invention with the sealing ring compressively loaded to effect a seal.

FIGS. 6 and 7 show a third embodiment of the present invention which is identical to the embodiment of FIGS. 1–3 except to the extent shown or described herein. Portions of the embodiment of FIGS. 6 and 7 corresponding to portions of the embodiment of FIGS. 1–3 are designated by corresponding reference numerals followed by the letter b. The primary purpose of the embodiment of FIGS. 6 and 7 is to adapt the concepts of FIGS. 1–3 to a ring joint groove, i.e., a groove with tapered sides.

The flanges 15b and 17b are identical to the flanges 15 and 17 except that the former provide a seal groove 23b of different construction and radii 57 are more generous than the corresponding radii of the flanges 15 and 17 of FIGS. 1–3. The groove 23b differs from the groove 23 in that the circumferentially extending wall sections 27b, 29b and 33b, 35b are inclined toward each other as they extend toward their respective end walls 25b and 31b. In addition, the ratio of the axial dimension of the groove 23b is greater than the corresponding ratio of the groove 23.

The seal 37b includes a sealing ring 39b which is of somewhat different shape than the sealing ring 39. Specifically, the sealing ring 39b is longer axially than the sealing 39 and the cavities 45b and 47b are more shallow.

Each of the retainer rings 41b and 43b has a concave portion 59 which cooperate with the cavities 45b and 47b, respectively, to mount the retainer rings on the sealing ring 39b. In addition, each of the retainer elements 41b and 43b has a pair of axial flanges 61 and 63, each of which is cylindrical. The flanges 61 and 63 are separated from the sealing ring 39b by circumferentially extending gaps.

In the position shown in FIG. 6, the sealing ring 39b is uncompressed and the ends of the flanges 61 and 63 engage the radii 57, respectively. As the flanges 15b and 17b are moved closer together in the manner described hereinabove with reference to FIGS. 1–3, the flanges 61 are cammed toward each other by the circumferentially extending wall sections 33b and 35b, and the wall sections 27b and 29b similarly cam the flanges 63 radially toward each other. The initial movement of the flanges 61 toward each other and of the flanges 63 toward each other is unrestrained except by the inherent resilience of the retainer rings 41b and 43b. Ultimately, however, the sealing ring 39b is squeezed between the flanges 61 and the flanges 63, and in addition, the sealing ring 39b is axially compressed and radially expanded by the end walls 25b and 31b.

In the position shown in FIG. 7, the sealing ring 39b has been caused to assume the general configuration of an I in cross section with the central portion of the I including a bulged region 65. In addition, the sealing ring 39b includes flanges 67 which engage the opposite ends of the retainer elements 41b and 43b. The volume of the cavity 23b relative to the volume of seal ring 39b is such that the concave portions 59 become resiliently flattened and ultimately inverted as permitted by the space defined by the radii 57. In the position shown in FIG. 7, the retainer rings 41b and 43b resiliently retain and load the sealing ring 39.

Although exemplary embodiments of the invention have been shown and described, many changes, modifications and substitutions may be made by one having ordinary skill in the art without necessarily departing from the spirit and scope of this invention.

I claim:

1. A seal comprising:
sealing ring means of deformable sealing material for circumscribing an object, said sealing ring means being subject to plastic flow in response to compressive loading thereof and having first and second circumferentially extending surfaces, said first and second surfaces at least partially defining first and second circumferentially extending cavities, respectively, at least when the sealing ring means is in a relaxed condition;
first and second retainer rings lying at least partially within said first and second cavities, said sealing ring means and said retainer rings being generally concentrically arranged; and
at least a portion of each of said retainer rings being concave in axial cross section at least when said retainer rings are in a relaxed condition, said concave portions of said first and second retainer rings opening in first and second directions, respectively, said first and second retainer rings being resiliently deformable independently of each other in the first and second directions, respectively, whereby upon compressively loading the sealing ring means the retainer rings are resiliently deformed.

2. A seal as defined in claim 1 wherein portions of said first and second surfaces are concave, said portions of said first and second surfaces at least partially defining said first and second cavities, respectively, said first and second cavities receiving at least a portion of each of the concave portions of said first and second retainer rings, respectively.

3. A seal as defined in claim 1 wherein each of said retainer rings is arcuate in axial cross section.

4. A seal as defined in claim 1 wherein said sealing ring means includes first and second independent sealing rings separated from each other along a circumferentially extending line, said first and second sealing rings being engageable at least when the sealing ring means is compressively loaded.

5. A seal as defined in claim 1 wherein said concave portions of said retainer rings cooperate with said cavities, respectively, to mount said retainer rings on said sealing ring means.

6. A seal as defined in claim 1 wherein said retainer rings are constructed of metal.

7. A seal as defined in claim 1 wherein said sealing ring means is constructed in substantial part of a fluoroplastic material.

8. A seal as defined in claim 1 wherein said first and second surfaces are inner and outer peripheral surfaces, respectively, said first and second retainer rings are inner and outer rings, respectively, said first and second directions are radially inwardly and radially outwardly, respectively.

9. A seal as defined in claim 1 wherein said seal is devoid of a connector between said retainer rings which is effective in tension.

10. A seal comprising:
sealing ring means for circumscribing an object, said sealing ring means being constructed of a fluoroplastic material and having inner and outer peripheral surfaces, portions of said inner and outer peripheral surfaces being concave, said portions of said inner and outer peripheral surfaces at least partially defining inner and outer cavities, respectively;

said sealing ring means being subject to plastic flow in response to compressive loading thereof;

inner and outer retainer rings lying at least partially within said inner and outer cavities, said sealing ring means and said retainer rings being generally concentrically arranged; and said first and second retainer rings being constructed of metal and being concave in axial cross section with the concavities opening radially inwardly and radially outwardly, respectively, said inner and outer retainer rings being resiliently deformable at least in the radial direction independently of each other with the concave configuration of said retainer rings contributing to such resilience, whereby upon axial compression and consequent plastic flow and radial expansion of the sealing ring means the retainer rings resiliently resist said radial expansion of the sealing ring means.

11. A seal as defined in claim 10 wherein said sealing ring means includes first and second independent sealing rings separated from each other along a circumferentially extending region, said first and second sealing rings being engageable at least when the sealing ring means is compressively loaded.

12. A seal as defined in claim 10 wherein said sealing ring means is in the form of a single integral mass of fluoro-plastic material.

* * * * *